United States Patent Office 2,823,781
Patented Feb. 18, 1958

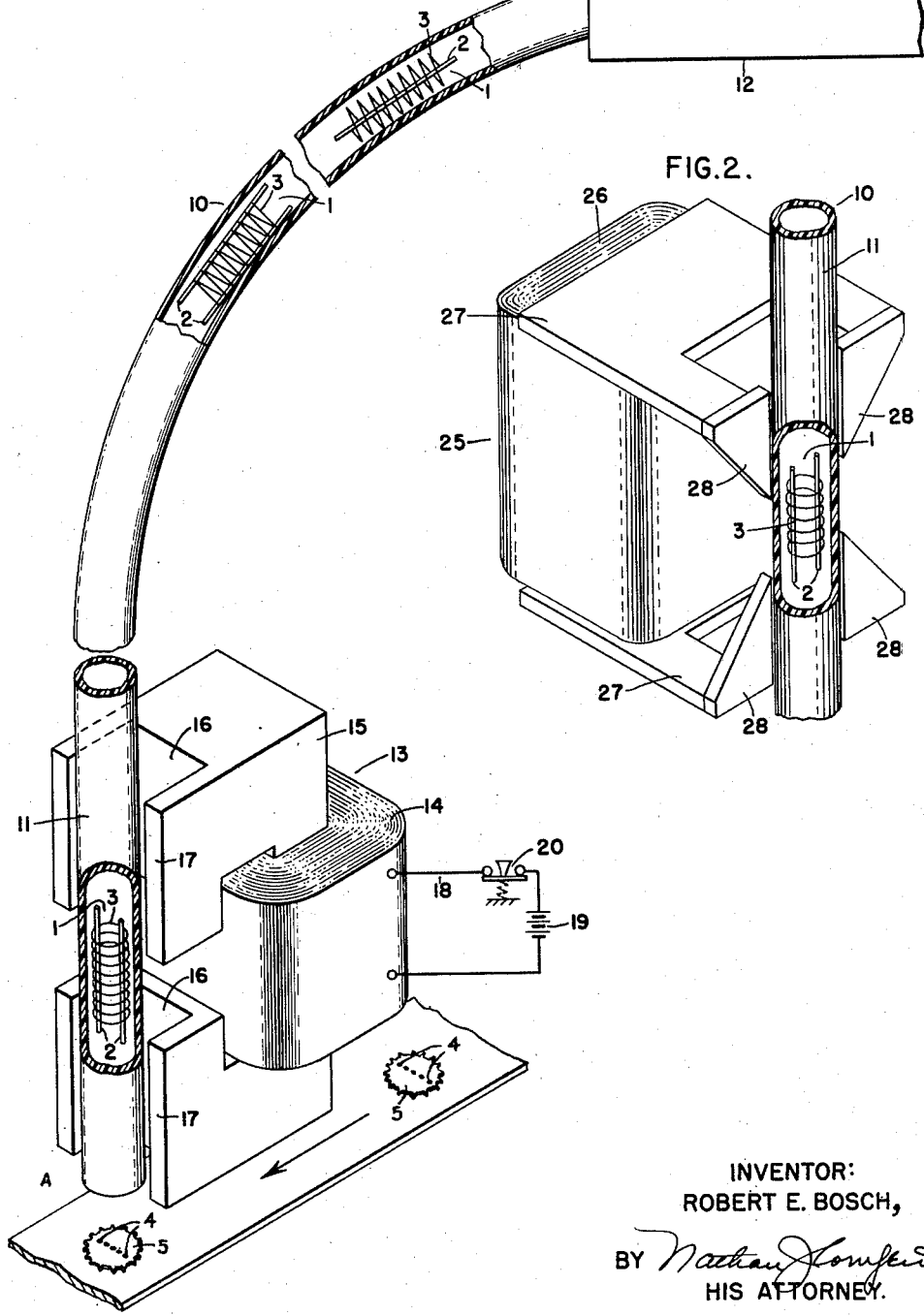

2,823,781
ARTICLE HANDLING APPARATUS

Robert E. Bosch, West Caldwell, N. J., assignor to General Electric Company, a corporation of New York Application February 27, 1956, Serial No. 568,066

3 Claims. (Cl. 193—43)

My invention relates generally to article handling apparatus and pertains more particularly to new and improved apparatus for handling articles with a minimum of physical contact.

Many manufacturing techniques include the automatic assembly of devices comprising a plurality of articles or elements. For example, in the electronics industry the electrode mount structure of electronic tubes are currently being assembled automatically. Among the problems generally encountered in such automatic assembly of electrode mount structures is the provision of satisfactory handling means or apparatus for positioning the articles or elements comprising the structures in a predetermined timed relation and in a predetermined oriented manner at operating or assembly stations. This problem is of increased seriousness when the articles being handled are inherently substantially fragile and susceptible to deformation or other damage by physical contact with handling apparatus. The grid elements of receiving tubes, and especially the suppressor grids, due to the relative high pitch or low number of turns per inch of the windings thereof, are elements which are difficult to handle since even slight forces, when applied against the windings thereof or when applied unequally to the ends of the support rods, often tend seriously to damage such elements. However, at least the support rods of such elements are generally formed of a magnetic material and many other articles which it is desired to handle automatically are magnetic at least in part. This property adapts them for magnetic handling; and, a primary object of the present invention is to provide new and improved apparatus for magnetically handling articles which are at least magnetic in part.

Another object of the present invention is to provide new and improved apparatus for handling articles of a fragile nature without causing damage thereto.

Another object of the present invention is to provide new and improved means for controlling the movement of articles in transporting means therefor.

Another object of the present invention is to provide new and improved apparatus adapted for positioning articles in a predetermined manner at an operating station with a minimum of physical contact therewith.

Another object of the present invention is to provide new and improved apparatus adapted for receiving randomly oriented articles and subsequently positioning same in a predetermined oriented manner at an operating station upon demand.

Still another object of the present invention is to provide new and improved article handling apparatus which is simple and inexpensive in construction and highly reliable in operation.

Further objects and advantages of my invention will become apparent as the following description proceeds and the features of novelty which characterize my invention will be pointed out with particularity in the claims annexed to and forming part of this specification.

In carrying out the objects of my invention I provide guide means adapted for determining the direction of transportation of articles admitted thereinto. Associated with the guide means is means for dispensing articles into the guide means in random orientation. Also associated with the guide means is means adapted for establishing a magnetic field in the guide means which is effective for magnetically arresting and predeterminedly orienting articles being transported thereby. Means provided for discontinuing the magnetic field is operable for releasing the arrested article from the guide means in the predetermined oriented position.

For a better understanding of my invention reference may be had to the accompanying drawing in which:

Figure 1 is a schematic and perspective illustration of article handling apparatus constructed in accordance with a preferred embodiment of my invention; and Figure 2 is a perspective illustration of a modified form of magnet for the apparatus of Figure 1.

Referring to Figure 1 of the drawing, I have for purposes of illustration shown my invention incorporated in article handling apparatus for positionnig electronic tube grid elements designated 1 and comprising spaced support rods 2 and spirally wound grid wires 3, upon demand in a predetermined oriented position at an assembly or operating station generally designated A. At the station A the ends of the grid rods 2 may be inserted, by suitable means not shown, in predeterminedly oriented apertures 4 in mica disks or insulators 5 which, by suitable means also not shown, may be positioned seriatim at the operating station A and, if desired, in synchronism with the demand operation of the apparatus, which will be described in detail hereinafter.

However, from the outset it is to be understood that my invention is not limited in application to the handling of grid elements, but as will be seen hereinafter is equally applicable to the handling of substantially any article which is magnetic at least in part.

The handling apparatus illustrated in the drawing includes guide means in the form of a transport tube or tubular element formed of a suitable non-magnetic material and generally designated 10. For example, the tube 10 could be formed, as shown, of an insulative plastic material; or, alternatively it could be formed of a non-magnetic conductive material, such as brass or the like. The tube 10 may be of any desired length and preferably includes a vertical portion 11 for directing and gravity feeding the grids 1 toward the assembly station A. Associated with the upper end of the tube 10 is dispensing means generally designated 12. The dispensing means 12 is adapted for admitting grids 1 seriatim into the tube 10 and, since it may be of any suitable and readily obtainable type, will not be described in detail herein. The grid dispenser 12 admits the grids 1 in random rotational orientation and it is in this orientation that the grids are illustrated in the upper broken-away portion of the tube and in which they are received in the vertical portion 11 of the tube 10. For purposes of illustrating the random orientation of the grids, they are shown in the upper broken-away portion of the tube in substantially close positions. In actual operation of the apparatus the grids will be fed into the tube 10 by the dispensing means in predetermined timed relation or in synchronism with the operation of other means such as the above-mentioned means for feeding the mica disks 5 into assembly station A.

Associated with the vertical portion 11 of the tube is an electromagnet generally designated 13 and including a coil 14 and a substantially U-shaped soft iron core member 15. The ends of the core member 15 are channelled at 16 for thus comprising a pair of spaced apart bifurcated U-shaped channel-like pole pieces 17 adapted for receiving or extending on either side of the vertical portion 11 of the tube 10. By this arrangement the magnet 13 is adapted when energized for establishing a substantially concentrated magnetic field or concentrated flux lines in the vertical portion of the tube. This magnetic field is effective for arresting a grid 1 descending in the vertical portion of the tube and maintaining it solely magnetically in a suspended condition in the manner illustrated. In this manner the grid is stopped in the tube and retained therein without any physical contact except the incidental contact made with the walls of the tube. Thus any tendency toward damage to the grid by physical contact with handling apparatus is greatly minimized.

It will be seen that the shaping of the pole pieces concentrates the flux lines most highly in opposite side portions of the tube 10. Thus, the grid support rods 2 are caused to align with the concentrated flux lines at either side of the tube and the field is effective for causing the grid to assume the predetermined rotationally oriented position thereof illustrated in the drawing. It will be seen that this orientation may be adjusted by adjusting the position of the magnet 13 about the longitudinal axis of the vertical portion 11 of the tube 10. It will be seen further that a subsequent deenergization of the magnet 13 will cause the magnetic field to collapse and thus permit the grid to drop to the operating station A in the mentioned oriented position in which the ends of the support rods 2 will be positioned for insertion into the apertures 4 of a disk 5 at the operating station.

Provided for controlling the energization of the magnet 13 is a circuit designated 18 including a power source 19 and a switch 20 of the type normally biased to a closed position. Thus, the circuit 18 is normally closed and the magnet 13 is energized normally for setting up or establishing the mentioned magnetic field in the transport tube. With the magnetic field normally established in the transport tube the apparatus is normally effective for stopping or arresting and rotationally orienting any grid element directed toward the station A from the grid dispenser 12 in the above-described manner.

Following arrestation and orientation of the grid the magnet control circuit 18 may be opened by opening the switch 20. This will effect deenergization of the magnet and collapse the field in the transport tube whereby the grid 1 will be permitted to fall under the influence of gravity in the previously oriented position into the operating station A wherein the lower ends of the grid rods 2 are suitably aligned for insertion into the apertures 4 of a mica insulator or the like disposed at the station A.

Illustrated in Figure 2 is a modified electromagnet structure generally designated 25 and adapted for increased magnetic field concentration in the vertical portion 11 of the transport tube 10. This structure includes a coil 26, a soft iron core (not shown) extending through the coil and a pair of spaced apart bifurcated soft iron flat pole pieces 27 suitably secured at either end of the core. The pole pieces 27 are suitably shaped to provide extensions thereof on either side of the tube 10. Suitably secured to the ends of the extensions of each pole piece 27 is a pair of substantially triangular pole portions 28 also formed of soft iron. The portions 28 of each pair are coplanar and extend diametrically oppositely on either side of the tube 10 and in close proximity to the tube and thus provide increased field concentration in the tube when the magnet 25 is energized. The just-described magnet construction is particularly adaptable for use where the articles being handled are relatively heavy and require a stronger field to suspend and orient them in the transport tube.

Thus, it will be seen that in the apparatus illustrated and constructed in accordance with my invention, the grids may be transported to the assembly station upon demand and in a predetermined oriented position with a minimum of any physical contact therewith and with no engagement thereof by clamping or gating means which would tend to damage fragile elements such as electronic tube grid elements.

It will be seen further that while the circuit 18 is shown as including a manually operable switch 20 to provide for release of an element in accordance with the demand of an operator, my invention is equally applicable to automatic systems wherein the switch 20 may be opened automatically in accordance with a predetermined signal as determined by the operation of other operating means. For example, the switch 20 could be caused to be opened by a signal resulting from the satisfactory positioning of a mica at the operating station A. Additionally, the dispenser 12 could be caused to operate and admit a grid into the transport tube upon a signal indicating that a grid had been released from the tube and that the magnetic field stood established or ready to stop and orient a succeeding grid.

Additionally, it will be seen that while I have shown my apparatus to include a transport tube adapted for gravity feeding grid elements, it is equally applicable to other arrangements. For instance, the transport tube can be of the type adapted for having elements moved therein under fluid pressure. In such an arrangement, an element might be blown by air into the magnetic field by which it would be arrested and oriented. Thereafter, the field would be collapsed upon demand and the element would be permitted to proceed under the influence of the air flow in the tube.

Additionally, while my invention has been illustrated and described in apparatus for arresting and orienting articles, it will be seen that it is equally applicable in apparatus adapted for arresting articles in transit to prevent damage thereto and without necessarily orienting them. For example, it is suitable for use in loading articles into trays or egg-crate cartons where orientation is of no particular import or could be otherwise effected. Further, it will be seen that my invention is applicable for controlling the movement of articles in transport and without necessarily arresting such movement. For example, it is effectively employable in controlling the velocity of articles in transport as by retarding the rate of movement in guide means in an adjustably controlled manner. Still further, my invention is clearly applicable in sorting apparatus. That is, articles in transport may be simply and effectively sorted in accordance with velocity and/or orientation through the use of apparatus constructed in accordance with the principles of my invention.

While I have shown and described specific embodiments of my invention I do not desire my invention to be limited to the particular forms shown and described, and I intend by the appended claims to cover all modifications within the spirit and scope of my invention.

What I claim as new and desire to secure by Letters Patent of the United States is:

1. Magnetic article handling apparatus comprising a non-magnetic tubular element for determining the direction of transportation of an article admitted thereinto, an electromagnet comprising a pair of spaced-apart bifurcated pole pieces, said spaced-apart pole pieces being aligned along the longitudinal axis of said tubular element with said tubular element being disposed intermediate bifurcated portions thereof, said electromagnet being adapted when energized for establishing a magnetic field in said tubular element effective for arresting said magnetic article in said tubular element, and means for deenergizing said magnet for collapsing said field thereby to effect release of said article from said tubular element upon demand.

2. Magnetic article handling apparatus comprising a non-magnetic transport tube including a vertical portion for gravity feeding an article received therein toward a predetermined operating station, an electromagnet including a pair of spaced apart U-shaped channel-like pole pieces, said spaced-apart pole pieces being aligned along the longitudinal axis of said tube with said tube being disposed in the U-shaped channel portions thereof whereby said electromagnet is adapted when said magnet is energized for establishing a substantially concentrated magnetic field in said tube effective for holding said article in a suspended condition and predeterminedly orienting said article in said tube, and means for deenergizing said magnet for collapsing said field thereby to permit said article to drop to said operating station in a predetermined, oriented position upon demand.

3. Magnetic article handling apparatus comprising a non-magnetic transport tube for determining the direction of transportation of an article admitted thereinto, and an electromagnet comprising a pair of spaced-apart bifurcated pole pieces aligned along the longitudinal axis of said tube, the bifurcated portions of said pole pieces being disposed on opposite sides of said tube and being triangular in configuration whereby said electromagnet is adapted when energized for establishing a magnetic field in said guide means effective for arresting and predeterminedly orienting said magnetic article in said transport tube with said bifurcated triangular-shaped pole pieces being effective for concentrating said field in said transport tube.

References Cited in the file of this patent
UNITED STATES PATENTS

| | | |
|---|---|---|
| 1,080,435 | Gamper | Dec. 2, 1913 |
| 1,747,934 | Heidenhain | Feb. 18, 1930 |
| 2,444,751 | Scott | July 6, 1948 |
| 2,581,042 | Otto | Jan. 1, 1952 |

FOREIGN PATENTS

| | | |
|---|---|---|
| 475,382 | Canada | July 17, 1951 |